United States Patent [19]

Doerfling

[11] Patent Number: 5,095,592

[45] Date of Patent: Mar. 17, 1992

[54] FASTENER DEVICE FOR COMPOSITE MATERIALS

[75] Inventor: Ralph G. Doerfling, Livonia, Mich.

[73] Assignee: ASC Colamco Corporation, Southgate, Mich.

[21] Appl. No.: 668,951

[22] Filed: Mar. 13, 1991

[51] Int. Cl.⁵ .............................................. A44B 21/00
[52] U.S. Cl. ....................................... 24/295; 24/293
[58] Field of Search ............... 24/295, 291, 292, 293, 24/294, 453; 49/491

[56] References Cited

U.S. PATENT DOCUMENTS

| | | |
|---|---|---|
| 2,066,814 | 1/1937 | Williams . |
| 2,148,848 | 2/1939 | Wiley . |
| 2,208,727 | 7/1940 | Marshall ................. 24/293 |
| 2,937,426 | 5/1960 | Barnes .................... 24/295 |
| 3,981,050 | 9/1976 | Dauphinais . |
| 4,300,745 | 11/1981 | Peterson . |
| 4,745,666 | 5/1988 | Murphy ................... 24/295 |
| 4,860,402 | 8/1989 | Dichtel . |
| 4,901,961 | 2/1990 | Gish . |

FOREIGN PATENT DOCUMENTS

| | | | |
|---|---|---|---|
| 0946900 | 6/1949 | France ............................... | 24/295 |
| 0472532 | 9/1937 | United Kingdom ............ | 24/295 |
| 0481573 | 3/1938 | United Kingdom ............ | 24/294 |
| 0482930 | 4/1938 | United Kingdom ............ | 24/295 |

Primary Examiner—Victor N. Sakran
Attorney, Agent, or Firm—Harness, Dickey & Pierce

[57] ABSTRACT

An improved attachment clip for use in securing automotive interior trim components to structural members within the motor vehicle is disclosed. The improved attachment clip includes an H-shaped body member adapted to be anchored directly to a core layer of the trim component, and an attachment clip member provided for securing the attachment clip and, in turn, the trim component to the rigid mounting structure. The H-shaped body member includes a central stem and a first pair of elongated prongs which project forwardly and transversely relative to the central stem. A second pair of elongated prongs project from the central stem so as to extend in a opposite direction from the first pair of prongs and which have a down-turned end portion. The first pair of elongated prongs are offset below a planar surface defined by an underside surface of the central stem and the second pair of prongs so as to extend generally parallel thereto. The attachment clip member extends forwardly from the central stem so as to be positioned between the first pair of elongated prongs. The clip is provided for coupling the attachment clip to the rigid mounting structure.

15 Claims, 1 Drawing Sheet

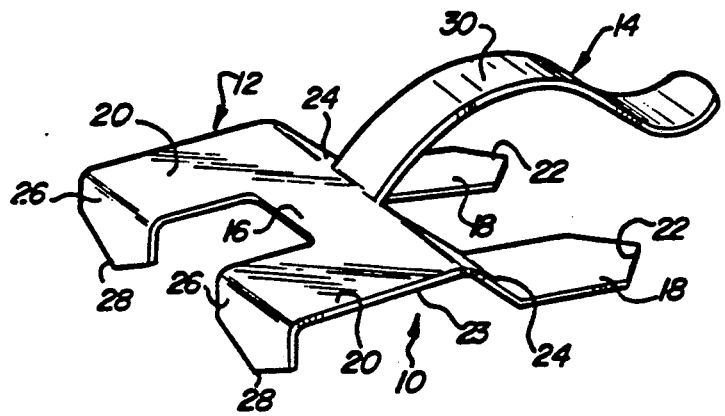
Fig-1
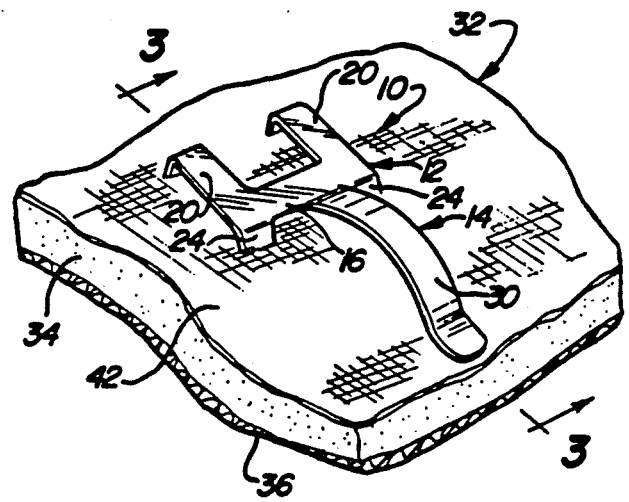
Fig-2
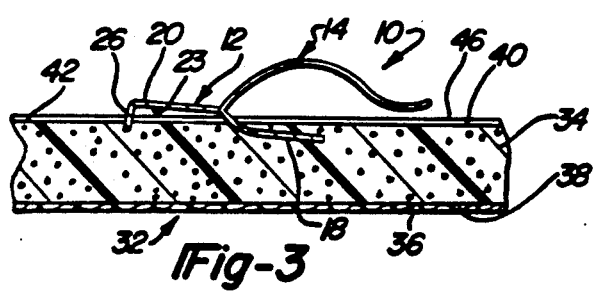
Fig-3
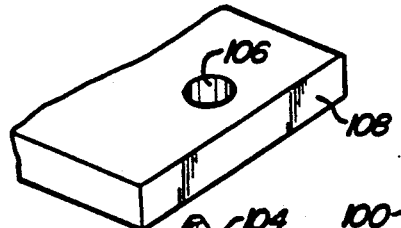
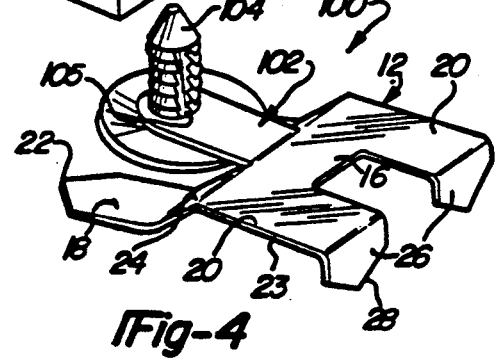
Fig-3A
Fig-4

FASTENER DEVICE FOR COMPOSITE MATERIALS

BACKGROUND OF THE INVENTION

The present invention relates to fastener devices and, more particularly, to an attachment clip for securing an automotive interior trim component within the passenger compartment of a motor vehicle.

In general, most automotive interior trim components, such as door panels and roof liners, are semi-structural components fabricated from a rigid core material laminated with a decorative "skin" material. One type of core material widely used for automotive trim components is an open-cellular polyether or polyurethane composite foam material impregnated with a prepolymer for improving structural rigidity and compressive strength. As noted, an exterior surface of the composite foam material is laminated with a decorative "skin" material for providing a color-coordinated and aesthetically pleasing surface. Conventional decorative "skin" material used in most automotive trim applications include woven fabrics, trico, vinyl, leather, and the like.

Open-cellular composite foam is a preferred material of choice for automotive interior trim applications because of its superior compressive rigidity, impact absorption and thermal and acoustical isolation properties. Unfortunately, a major drawback associated with use of composite foam materials is their low tensile strength. As such, objects anchored to foam composite materials are easily 'pulled-out' upon a tensile force being exerted thereon. This poor "pull-out" characteristic severely limits the type of fastener devices which are suitable for anchoring semi-structural automotive trim component fabricated from composite foam material to a rigid mounting structure (i.e., the roof panel).

SUMMARY OF THE INVENTION

It is therefore an object of the present invention to overcome the disadvantages associated with conventional fasteners by providing an improved fastener device adapted to be rigidly anchored to a composite open-cellular foam material. More particularly, the improved fastener device is designed to resist being torn or "pulled-out" of the composite foam material when a tensile "pull" force is exerted thereon.

It is another object of the present invention to provide an improved fastener device having an off-center attachment projection which is adapted to cause rotational loading on the fastener device for increasing the "pull-out" resistance thereof.

It is a further object of the present invention to provide an attachment clip which is particularly well suited for use in securing automotive interior trim components to structural members within the motor vehicle.

In a preferred form, the improved attachment clip includes an H-shaped body member adapted to be anchored directly to the composite foam material, and an attachment projection member provided for securing the attachment clip and, in turn, the composite foam material to a rigid mounting structure. The H-shaped body member includes a central stem and a first pair of elongated prongs which project forwardly and transversely relative to the central stem. The first pair of elongated prongs terminate in a sharp point capable of penetrating the composite foam material. A second pair of elongated prongs project from the central stem so as to extend in an opposite direction from the first pair of prongs and which have a down-turned end portion terminating in a sharp point. Moreover, the first pair of elongated prongs are offset below a planar surface defined by an underside surface of the central stem and the second pair of prongs so as to extend generally parallel thereto. The attachment projection is a sinusoidal spring clip which extends forwardly from the central stem so as to be positioned between the first pair of elongated prongs. The sinusoidal spring slip is provided for slidingly receiving and retaining a portion of the rigid mounting structure thereunder.

In operation, the first pair of prongs are forcibly slidably inserted into the composite foam material. Thereafter, the down-turned ends of the second pair of prongs are forcibly inserted into the composite material until the co-planar underside surface of the central stem and the second pair of prongs engages the outer surface of the composite foam material. In this manner, the improved attachment clip is easily and simply anchored to the composite foam material. Thereafter, sliding insertion of the rigid mounting structure between the sinusoidal spring clip and the outer surface of the composite foam material acts to bias the second pair of prongs into compressive engagement with the outer surface of the composite foam material. Concurrently, the first pair of prongs, anchored so as to extend longitudinally within the composite foam material, are oppositely biased such that their relatively large surface area inhibits "pull-out" of the attachment clip from the composite foam material. Exertion of a "pull" force on the composite foam material causes "over-center" loading on the sinusoidal spring clip which, in turn, act to rotatably bias the H-shaped body member. This "over-center" loading produces substantially equal and opposite biasing forces which are exerted on the composite foam material via the oppositely extending first and second pair of prongs. Thus, the opposed biasing forces are effectively cancelled for increasing resistance to "pull-out" of the attachment clip from the composite material.

Further objects and advantages of the present invention will be apparent from the following description, referenced being made to the accompanying drawings wherein preferred embodiments of the present invention are clearly illustrated.

BRIEF DESCRIPTION OF THE DRAWINGS

FIG. 1 is perspective view of an improved attachment clip constructed in accordance with a first embodiment of the present invention;

FIG. 2 is a pictorial view illustrating initial insertion of the improved attachment clip of FIG. 1 into an exemplary composite foam material;

FIG. 3A is a cross-sectional view taken along line 3—3 of FIG. 2;

FIG. 3B is a view, similar to FIG. 3A, illustrating the improved attachment clip fixably anchoring the composite foam material to a mounting structure; and FIG. 4 is a perspective view of an alternative embodiment of the present invention.

DETAILED DESCRIPTION OF THE PREFERRED EMBODIMENTS

With particular reference now to FIG. 1, an attachment clip 10 constructed in accordance with a first embodiment of the present invention is shown to include a generally H-shaped body member 12 and an attachment projection member 14. H-shaped body member 12 includes a central stem 16, a first pair of forwardly extending elongated prongs 18, and a second pair of rearwardly extending prongs 20. The forward ends of elongated prongs 18 terminate in a sharp point 22 provided for penetrating fibrous and/or open-cellular composite materials in a manner described hereinafter in greater detail. Elongated prongs 18 are bent to extend below and generally parallel to a co-planar underside surface 23 defined by central stem 16 and rear prongs 20. More particularly, the first pair of elongated prongs 18 are offset relative to central stem 16 and the second pair of prongs 20 by a predetermined displacement as defined by ramp portion 24 of elongated prongs 18. In addition, the rearwardly extending second pair of prongs 20 each have a down-turned end portion 26 which terminates in a sharp point 28 also provided for penetrating the composite material.

With continued reference to FIGS. 1, attachment clip 10 is also shown to include forwardly extending attachment projection member 14 for securing attachment clip 10 and, in turn, the composite material to a rigid mounting structure. In accordance with the first embodiment, attachment projection 14 is an integral sinusoidal spring clip member 30 provided in spaced relation between the first pair of elongated prongs 18.

With particular reference now to FIGS. 2, 3A and 3B, a method of installing or "anchoring" attachment clip 10 to a composite material will now be described in greater detail. In general, attachment clip 10 is preferably adapted for rigidly securing a contoured automotive interior trim component, made from a semi-structural composite material, in a permanent or semi-permanent manner to a rigid mounting structure provided within the motor vehicle. More preferably, attachment clip 10 of the present invention is particularly well adapted for use with open-cellular foam composite materials for improving tensile "pull-out" characteristics. A portion of an exemplary automotive interior trim component (i.e., a roof liner), generally designated by reference numeral 32, is shown as a laminated multi-layer component having a relatively thick base or "core" layer 34 with a relatively thin layer of a decorative exterior "skin" material 36 bonded (i.e., laminated) to a first surface 38 of core layer 34. In the embodiment disclosed, core layer 34 is made from an open-cellular composite foam material while a suitable decorative "skin" material may include woven fabric, trico, vinyl, leather, or the like. In addition, a second surface 40 of core layer 34 is shown to have a reinforcing scrim 42 (such as a woven glass fiber scrim) bonded thereto. It is to be understood that while the specific type of composite material used for core layer 34 is not a limitation to the present invention, attachment clip 10 is particularly well suited for use with a core layer 34 made from rigid polyether and polyurethane foam.

With reference now to FIGS. 2 and 3A, attachment clip 10 is shown with the first pair of elongated prongs 18 forcibly slidably inserted into surface 40 of core layer 34 so as to extend in a generally horizontal manner at a predetermined depth within core layer 34. Preferably, pre-punched slots or recesses are formed in scrim 40 to assist in the sliding penetration of elongated prongs 18 therethrough. Alternatively, sharp points 22 are capable of acting as a punch for permitting relatively easy penetration of prongs 18 into composite core layer 34 in those applications where pre-punched slots are not provided. Following insertion of elongated prongs 18, down-turned ends 26 of the second pair of prongs 20 are forcibly inserted for penetrating composite core layer 34 until co-planar underside surface 23 of rear prongs 20 and central stem 14 engage scrim 40.

In operation, sliding insertion of a rigid mounting member partially shown at 44, between spring clip 30 and outer surface 46 of composite trim component 32 acts to rotatively bias H-shaped body member 12 such that at least a portion of underside planar surface 23 of central stem 16 and rear prongs 20 compressively engages outer surface 46 of composite trim component 32. Furthermore, underside surface 23 of central stem 16 and rearwardly extending prongs 20 provides a relatively large area of surface contact with outer surface 46 for effectively distributing the compressive loading exerted thereon. In addition, the forwardly extending elongated prongs 18 are concurrently biased so as to exert a tensile force on the composite material. As such, the relatively broad surface area of elongated prongs 18 and the compressive spring biasing force exerted on rigid mounting member 44 via tab 48 of sinusoidal spring clip 30 coactively resist "pull-out" of attachment clip 10 form core layer 34. More particularly, any attempt to pull trim component 32 from rigid mount member 44 generates a "pull-out" force which is directly exerted on tab 48 of sinusoidal spring clip 30. This "pull-out" force produces an over-center load on spring clip 30 which, in turn, acts to rotatably bias attachment clip 10 relative to core layer 34. As mentioned, the rotational biasing acts to increase the magnitude of the "pull-out" force necessary for physically tearing attachment clip 10 from composite core layer 34. Moreover, this over-center biasing arrangement produces substantially equal and opposite biasing forces which are exerted on core layer 34 through the first and second pairs of prongs 18 and 20, respectively. As a result, the opposed biasing forces are effectively cancelled. Therefore, the present invention provides a novel anchoring and fastening device which substantially augments the "pull-out" resistance of fastener device 10 when anchored in a composite material having low tensile strength.

With preference now to FIG. 4, an alternative embodiment of the present invention is disclosed. As will be appreciated, attachment clip 100 is substantially identical to attachment clip 10 of FIG. 1 with the exception of utilization of an alternative attachment member 102. More particularly, sinusoidal spring clip 30 is replaced with a relatively planar attachment clip member 102 which is shown to extend forwardly along a common plane with center stem 16 and rearwardly extending prongs 20. An upstanding one-way (i.e., x-mas tree) rivet 104 extends transversely through an aperture 105 in clip member 102 for "snap-in" receipt in an associated aperture 106 formed in mounting member 108. As will be appreciated, upon "snap-in" installation of rivet 104 into locking aperture 106, any attempt to "pull-out" attachment clip 100 exerts an over-center load on clip member 102 for rotatably biasing H-shaped body member 12 in a manner substantially identical to that hereinbefore described in reference to the first embodiment.

Preferably, attachment clips 10 and 100 of the present invention are made from a single-piece metal blank, such as a spring steel material, which has been suitably heat treated to ensure that front and rear prongs 18 and 20, respectively, do not become bent or deformed in normal use. However, it will be appreciated at other suitable semirigid resilient materials can likewise be used with the present invention. It will also be appreciated that the present invention can also be used with other open-cellular core materials having relatively poor "pull-out" strength. Thus, the present invention provides for a simple and relatively inexpensive attachment clip device which is particularly well suited for securely anchoring composite materials having poor "pull-out" loading characteristics. From the foregoing, it will be apparent that the improved fastener devices 10 and 100 provide a highly advantageous way of augmenting "pull-out" resistance while at the same time permitting easy and simple installation.

As will be appreciated by those skilled in the art, the above described embodiments may be subject to change or modification without departing from the scope of the present invention.

What is claimed is:

1. An attachment clip for securing a component made from an open-cellular core material to a mounting structure, said attachment clip comprising:
    a body member adapted to be anchored to said core material, said body member including a central stem, a first pair of elongated prongs extending forwardly and below said central stem and which terminate in a sharp point provided for penetrating said core material, said first pair of elongated prongs adapted to extend generally longitudinally under a predetermined depth of said core material so as to be retained therein, and a second set of elongated prongs extending rearwardly and generally co-planar with said central stem for restingly engaging an outer surface of said core material, said second pair of elongated prongs having a down-turned end portion terminating in a sharp edge for penetrating said core material following insertion of said first pair of elongated prongs in said core material; and
    attachment means extending from said central stem for securing said body member to said mounting structure, said attachment means adapted to rotatably bias said body member upon a tensile pull-out force being exerted thereon such that said first and second pairs of elongated prongs are oppositely biased relative to said core material for increasing resistance to said attachment clip being pulled-out of said core material.

2. The attachment clip of claim 1, wherein said first pair of elongated prongs are offset below a co-planar surface defined by an underside surface of said central stem and said second pair of elongated prongs so as to extend generally parallel thereto.

3. The attachment clip of claim 2, wherein said attachment means is a forwardly extending clip member projecting from said central stem so as to be positioned between said first pair of elongated prongs, said clip member adapted to couple said body member to said mounting structure such that said pull-out force causes an over-center load to be exerted on said clip member for rotatably biasing said body member, whereby said first pair of prongs are biased upwardly relative to said outer surface of said core material for exerting a tensile force thereon while said second set of prongs are biased downwardly relative to said outer surface of said core material for exerting a compressive force thereon.

4. The attachment clip of claim 3, wherein said clip member is a generally sinusoidal spring clip adapted to receive sliding insertion of said mounting structure, said sinusoidal spring clip having a resilient tab portion adapted to exert a compressive biasing force on said mounting structure for retaining said mounting structure thereunder, said resilient tab portion adapted to produce said over-center load upon said pull-out force being transmitted therethrough for causing said rotational biasing of said body member.

5. The attachment clip of claim 3, wherein said attachment means is a planar clip member extending from said central stem between said first pair of elongated prongs, said planar clip member extending along a relatively common plane with said central stem and said second pair of rearwardly extending prongs, said planar clip member including fastener means extending transversely through an aperture in said clip member for snap-in receipt into an associated locking aperture formed in said mounting structure.

6. The attachment clip of claim 3, wherein said component is an automotive interior trim component made from a semi-structural composite open-cellular foam material, and wherein said mounting structure is a rigid mounting member located within a passenger compartment of a motor vehicle.

7. An improved attachment clip for securing a decorative trim component fabricated from an open-cellular core material to a structural mounting member within a motor vehicle, said attachment clip comprising:
    a generally H-shaped body member adapted to be anchored to said core material, said H-shaped body member having a central stem portion, a first pair of elongated prongs which extend forwardly and below said central stem and which terminate in a sharp point capable of penetrating said core material, said first pair of elongated prongs adapted to generally longitudinally penetrate said core material so as to be retained under a predetermined depth thereof;
    a second pair of elongated prongs projecting from said central stem so as to extend in an opposite direction from said first pair of prongs, said second pair of prongs generally extending in a common plane with said central stem and having down-turned end portions terminating in a sharp point capable of penetrating said core material, said second pair of elongated prongs adapted to engage an exterior surface of said core material; and
    over-center attachment means extending forwardly from said central stem and provided for securing said H-shaped body member to said mounting member, said over-center attachment means adapted to rotatably bias said first and second pairs of prongs upon a tensile pull-out force being exerted on said core material, whereby said first pair of prongs are biased in a first direction to apply a tensile force on said core material while said second set of prongs are biased in a second direction to exert a compressive force on said composite foam material, said biasing forces being substantially equal and opposite for effectively negating said pull-out force for increasing resistance to said attachment clip being pulled-out of said core material.

8. The attachment clip of claim 7 wherein said first pair of prongs are bent to extend below and be generally parallel to said common plane defined by said central stem and said second set of rearwardly extending prongs.

9. The attachment clip of claim 8, wherein said over-center attachment means is a planar clip member extending forwardly from said central stem and disposed between said first pair of elongated prongs, said clip member extending along a relatively common plane with said central stem and said second pair of rearwardly extending prongs, said clip member including fastener means extending transversely through an aperture in said clip member for snap-in receipt into an associated locking aperture formed in said mounting member, whereby upon attempting to pull said core material from said mounting member said pull-out force is exerted on said clip member for producing an over-center load thereon for rotatably biasing said body member.

10. The attachment clip of claim 8, wherein said over-center attachment means comprises a resilient sinusoidal spring clip provided for retaining said mounting member upon sliding insertion of said mounting member between said spring clip and said outer surface of said core material.

11. The attachment clip of claim 10, wherein said sinusoidal spring clip has a tab portion engaging said mounting member for exerting a compressive biasing force thereon for exerting a compressive force on a portion of said core material located below said mounting member and above said forwardly extending first set of prongs for coactively resisting pull-out of said attachment clip.

12. The attachment clip of claim 8, wherein said first and second pairs of elongated prongs are adapted not to deform and bend upon exertion of said pull-out force on said attachment clip.

13. A method for securing a component fabricated from an open-cellular composite material to a rigid mounting member, said method comprising the steps of:

anchoring an attachment clip to said core material, said attachment clip including a body member having a first pair of forwardly extending offset prongs inserted into said composite material in a generally longitudinal manner so as to be retained therein, a second set of rearwardly extending prongs adapted to engage an exterior surface of said core material, and an attachment projection extending forwardly between said first pair of prongs; and securing said attachment projection to said rigid mounting member wherein upon a tensil pull-out force being exerted on said composite material an over-center load is exerted on said attachment projection for causing said body member to be rotatably biased such that said first and second pairs of prongs are oppositely and equally biased for increasing resistance to pull-out of said attachment clip from said composite material.

14. The method of claim 13, wherein said anchoring step includes the steps of:

forcibly inserting said first pair of prongs into said composite material; and forcibly inserting down-turned end portions of said second pair of prongs into said composite material, said first pair of prongs offset below said second pair of prongs such that a planar underside surface of said second set of prongs engages said exterior surface of said composite material.

15. The method of claim 13 further including the step of inhibiting pull-out of said attachment clip body member from said composite material by generating an over-center load on said attachment projection which is adapted to rotatably bias said body member, whereby the biasing forces exerted on said composite material by said first and second pairs of prongs are opposite and substantially equal for effectively negating said pull-out force exerted on said attachment projection.

* * * * *